United States Patent [19]
Allcock et al.

[11] Patent Number: 5,898,062
[45] Date of Patent: Apr. 27, 1999

[54] POLY (ORGANOPHOSPHAZENE) HYDROGELS

[75] Inventors: Harry R. Allcock, State College; Archel M. A. Ambrosio, Philadelphia, both of Pa.

[73] Assignee: The Penn State Research Foundation, University Park, Pa.

[21] Appl. No.: 08/833,868

[22] Filed: Apr. 10, 1997

Related U.S. Application Data

[60] Provisional application No. 60/017,114, Apr. 10, 1996.
[51] Int. Cl.⁶ ...................................................... C08G 79/02
[52] U.S. Cl. ......................... 528/168; 528/167; 528/169; 528/228; 528/229; 528/367; 528/368; 528/369; 528/399
[58] Field of Search ..................................... 528/168, 167, 528/169, 228, 229, 367, 368, 369, 399

[56] References Cited

U.S. PATENT DOCUMENTS

| | | | |
|---|---|---|---|
| 4,440,921 | 4/1984 | Allcock et al. | 528/168 |
| 4,880,622 | 11/1989 | Allcock et al. | 424/78 |
| 5,053,451 | 10/1991 | Allcock et al. | 524/600 |
| 5,308,701 | 5/1994 | Cohen et al. | 428/402.22 |
| 5,414,025 | 5/1995 | Allcock et al. | 522/46 |
| 5,464,932 | 11/1995 | Allcock et al. | 528/399 |
| 5,562,909 | 10/1996 | Allcock et al. | 428/280.1 |

OTHER PUBLICATIONS

Allcock, et al., Biomaterials, 19, 509 (1988).
Cohen, et al., J. Am. Chem. Soc., 112, p. 7832–7833 (1990).
Allcock, et al., Macromolecules, 25, pp. 5573–5577 (1992).

*Primary Examiner*—Terressa Mosley
*Attorney, Agent, or Firm*—Thomas J. Monahan

[57] ABSTRACT

Poly (organophosphazene) polymers bearing various ratios of a carboxylic acid containing sidegroup and an alkylamino, alkoxy, or alkoxy ether sidegroup are disclosed. These water-soluble macromolecules are cross-linked and allowed to absorb water to form hydrogels. Because of their anionic character and high water content, the polymeric hydrogels are useful for a wide variety of biomedical applications including controlled drug delivery (e.g. pH sensitive drug delivery), biocompatible coatings, and pH sensitive membranes.

8 Claims, 6 Drawing Sheets

POLY (ORGANOPHOSPHAZENE) HYDROGELS

This application claims priority to U.S. Provisional Patent Application No. 60/017,114 filed Apr. 10, 1996.

This invention was made with government support under contract number DAAH04-94-G-0403 awarded by the Army Research Office. Accordingly, the government has certain rights in this invention.

FIELD OF THE INVENTION

The present invention relates to the field of anionic poly(organophosphazene) polymers and their use as hydrogels. The anionic poly(organophosphazene) hydrogels of the present invention are useful for a wide variety of applications including controlled drug delivery (e.g. pH sensitive drug delivery), biocompatible coatings, and ion exchange membranes.

BACKGROUND OF THE INVENTION

The design and synthesis of new macromolecules for the preparation of hydrogels is one of the major challenges of modern polymer chemistry. A variety of polymeric hydrogels and their membranes are used in applications as diverse as gas separations, microfiltration, hyperfiltration, hemodialysis, electrodialysis, biocompatible coatings and controlled drug delivery. There is continuing need for new and improved hydrogels especially in biomedical engineering applications.

Hydrogels are polymeric networks which contain relatively large amounts of water. These types of materials have been investigated extensively for potential biomedical applications because of their similarities to soft tissues and their potential tissue and blood compatibility behavior. They are also of interest as membrane materials in both biological and non-biological applications and as surface coatings to generate highly hydrophilic surfaces. Of particular importance are ionic hydrogels because of their equilibrium degree of swelling is affected by changes in pH or ionic strength. These ionic hydrogels usually contain ionizable pendent groups such as carboxylic acid, sulfonic acid, or quaternized amino units. Because of their ionic nature, these hydrogels have special properties for use in membranes and in pH sensitive drug delivery systems. pH sensitive hydrogels with anionic groups, in particular, are especially promising for biomedical uses since these gels have been shown to be better bioadhesives than their cationic or neutral counterparts (see Brøndsted, H.; Kopecek, J. In *Polyelectrolyte Gels*; Harland, R. S.; Prud'homme, R. K., Ed.; ACS: Washington D. C., 1992; Vol. 480, p. 285; and Leung, S. S.; Robinson, J. R. In *Polyelectrolyte Gels*; Harland, R. S.; Prud'homme, R. K., Ed.; ACS: Washington D. C., 1992; Vol. 480, p. 269). Furthermore, it has been shown that anionic surfaces with high charge density generate improved blood compatibility (see Goggins, J. A. et al. In *Advances in Biomedical Polymers*; Gebelein, C. G., Ed.; Plenum Press: New York, 1987; Vol. 35, p. 215; and Helmus, M. N. et al. *J. Biomed. Mater. Res.* 1984, 18, 165).

For many biomedical applications, synthetic polymers are generally preferred over natural polymers for their reproducibility and ease of manufacture. Synthetic polymers are used increasingly in medical science due to the chemist's ability to incorporate specific properties such as strength, hydrogel characteristics, permeability or biocompatibility, particularly in fields like cell encapsulation and drug delivery where such properties are often prerequisites. However, harsh conditions, e.g., heat or organic solvents, are usually used when encapsulating with these polymers often causing difficulties in encapsulating sensitive entities, e.g. proteins, liposomes, and mammalian cells.

A number of different polymers have been used for controlled drug delivery. Some examples include the biodegradable polymers poly(anhydrides), poly(orthoesters), and poly(lactic acid) and the non-degradable polymers ethylene vinyl acetate and poly(acrylic acid). Various polyphosphazene polymers have also been shown to be useful for controlled drug delivery. For example, U.S. Pat. No. 4,880,622 to Allcock et al. and U.S. Pat. No. 5,053,451 to Allcock et al. (both incorporated herein by reference) disclose polyphosphazene polymer hydrogels including their use as drug delivery devices formed by standard techniques including: dissolution and casting of the polymer into a film or disk, dissolution of the polymer and cross-linking by covalent bonding or by irradiation to form a soft gel, and compression of polymer particles into a disk.

Synthetic polymers are also widely used for membrane applications. The synthetic polymers currently used as membranes can be divided into two categories: (1) neutral polymers such as polyethylene, poly(methyl methacrylate), poly(organosiloxanes), and cellulose acetate, and (2) ionic polymers such as poly(acrylic acid), sulfonated polystyrene, and perfluorinated ionomers. The consideration of a polymer for incorporation into membranes involves a subtle balancing of properties such as hydrophilicity, molecular weight, crystallinity, polarity, mechanical strength, and the solvation-type affinity between specific polymers and small molecule solutes or gas molecules. In these terms, the tailoring of sophisticated membrane systems is still in its infancy. For this reason, poly(organophosphazenes) are especially attractive as candidates for membrane applications.

In prior publications, we have reported that the macromolecular substitutive synthesis of poly(oranophosphazenes) allows the properties of these polymers to be varied over a wide range by the incorporation of different substituent groups (R) [Allcock, H. R. *Chem. Eng. News* 63,22 (1985)]. These property changes can be orchestrated with great subtlety both by varying the R group in single substituent polymers and by the use of two or more cosubstituent groups attached to the same chain. In this way individual polymers may be hydrophobic, amphiphilic, or hydrophilic; water-stable or water-erodable; crystalline or amorphous; or bioinert or bioactive. Our previous work has demonstrated methods for the radiation cross-linking of specific polyphosphazenes in order to optimize their behavior as membranes or hydrogels [see, for example, Allcock, H. R. et al. *Biomaterials* 19, 509 (1988)].

SUMMARY OF THE INVENTION

The use of polyphosphazenes for the preparation of pH-sensitive hydrogels offers significant advantages over the use of totally organic polymers. First, fine-tuning the properties of the polymer by varying the ratios of the cosubstituents is more easily achieved with polyphosphazenes because of the wide applicability of the macromolecular substitution route mentioned above. Second, a potentially higher charge density per polymer chain can be obtained since each repeat unit can have two side chains that bear ionizable groups. Exploitation of these advantages have led to the present discovery.

The present invention discloses novel polyphosphazenes containing cosubstituent groups that provide the polymer with properties desirable for many hydrogel and membrane applications. These polymers when formed into hydrogels and membranes are especially useful for biomedical applications. The novel polymers of the present application are represented by the formula $[-N=P(R_1)_x(R_2)_y-]_n$. The substituent group $R_1$ is an alkoxy, aryloxy, alkylaryloxy, alkylamino, or arylamino group containing at least one carboxylic acid unit and the substituent group $R_2$ is an alkoxy or alkoxyether group of the formula $-O-[(R_3)-O]_z-(R_4)$, wherein z is an integer of 0 to 40 and $R_3$ and $R_4$ are aliphatic groups which may contain an amino unit. Preferably $R_3$ and $R_4$ are alkyl or alkylamino groups containing 1 to 3 carbon atoms each. Further, the alkyl groups can vary within the polymer. Particularly preferred embodiments include those when $R_2$ contains at least one unit selected from the group consisting of methoxyethoxy, (methoxyethoxy)ethoxy, (aminoethoxy)ethoxy, (butoxyethoxy)ethoxy, and (ethoxyethoxy)ethoxy.

In the formula $[-N=P(R_1)_x(R_2)_y-]_n$ the coefficients x and y are >0 such that x+y =2 but are not otherwise limited since the ratio of the cosubstituent groups may vary widely. The exact ratio of x to y chosen will depend on the intended application of the polymer. However, in general, the ratio of x to y can be in the range of about 0.99:0.01 to 0.01:0.99, preferably about 0.8:0.2 to 0.2:0.8, more preferably about 0.7:0.3 to 0.3:0.7, and most preferably the ratio is within the range of about 0.6:0.4 to 0.4:0.6. The number of repeating units, n, is also not particularly limited. However, n usually ranges from 3 to about 100,000, preferably about 1,000 to 20,000, more preferably about 5,000 to 15,000 and most preferably n is about 10,000.

In one embodiment disclosed herein, the poly (organophosphazene) of the present invention contains carboxylatophenoxy as the anionic cosubstituent and the other substituent is (methoxyethoxy)ethoxy. In the examples demonstrated herein, the carboxylic acid unit is in the para position but may also be in the meta or ortho positions. This polymer is treated to undergo cation induced cross-linking to form hydrogels.

In a preferred embodiment of the poly (organophosphazene) of the present invention, at least 25% of $R_1$ are alkoxy, aryloxy, alkylaryloxy, alkylamino, or arylamino groups containing at least one carboxylic acid unit and at least 25% of $R_2$ are alkoxy or alkoxyether groups of the formula $-O-[(R_3)-O]_z-(R_4)$ More preferably these percentages for $R_1$ and $R_2$ are greater than 50% and even more preferably they are greater than 75%. In a most preferred embodiment, substantially all of $R_1$ are alkoxy, aryloxy, alkylaryloxy, alkylamino, or arylamino groups containing at least one carboxylic acid unit and substantially all of $R_2$ are alkoxy or alkoxyether groups of the formula $-O-[(R_3)-O]_z-(R_4)$.

DETAILED DESCRIPTION OF THE INVENTION

Figure 1:
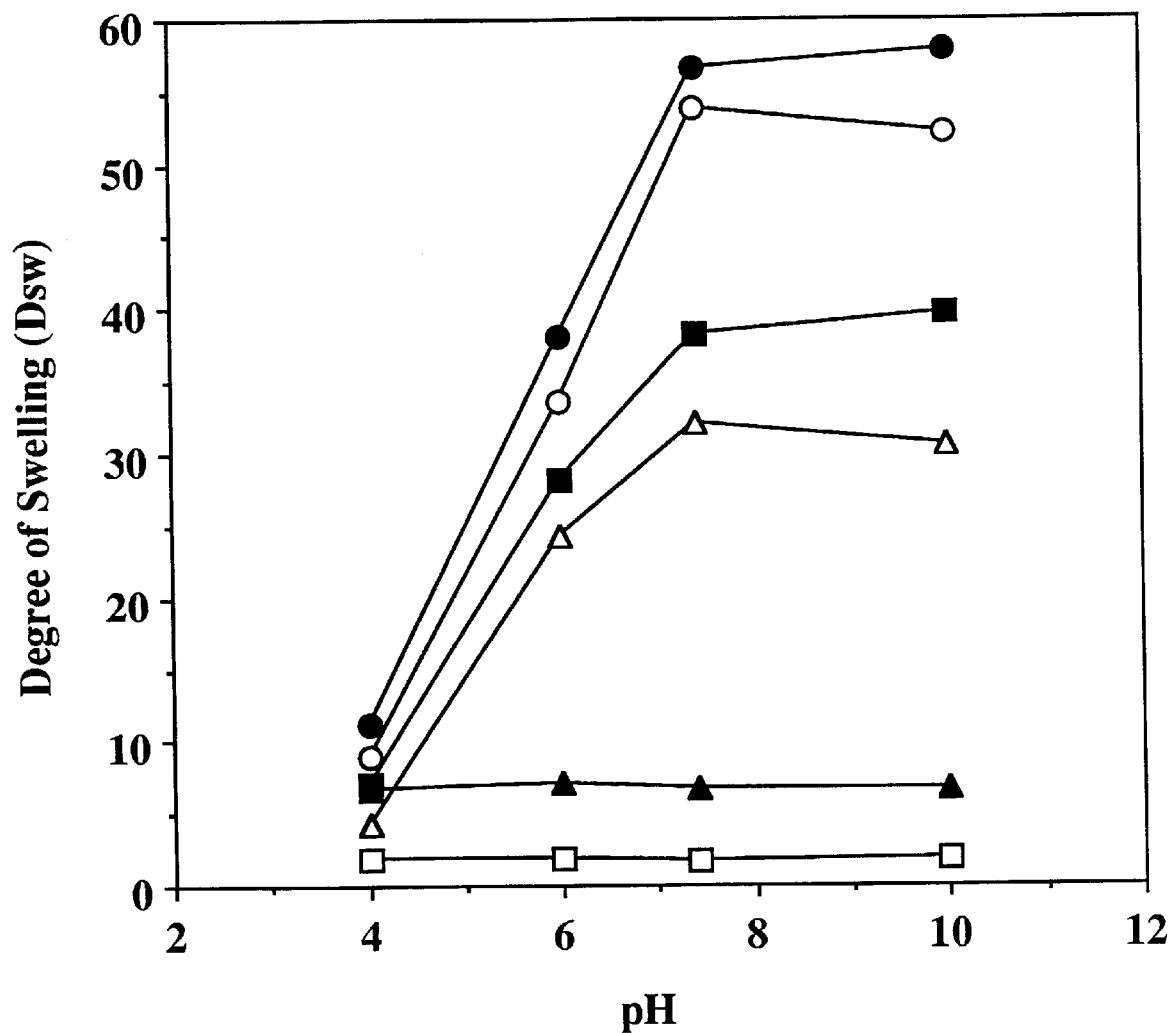
FIG. 1 graph showing the effect of pH on the equilibrium degree of swelling of the hydrogels: 4b (triangle), 5b (dark square), 6b (circle), 7b (dark circle), and control (dark triangle). The swelling behaviors of hydrogels 4a–7a are represented by a square.

As we have stated, certain poly(organophosphazenes) possess properties that make them appealing as stable hydrogels. These high molecular weight polymers have a backbone of alternating phosphorus and nitrogen atoms, and two organic groups linked to each phosphorus. Many derivatives with different side groups are accessible via macromolecular substitution reactions carried out with poly (dichlorophosphazene), including water-soluble species with alkyl ether side groups. Radiation cross-linking of these polymers generates materials that absorb water to form hydrogels.

It has been shown that a $Ca^{2+}$ induced cross-linking of poly[bis(carboxylatophenoxy) phosphazene] produces a hydrogel and that this system is useful for biological microencapsulation and for complexation to other metal cations (Cohen et al. J. Am. Chem. Soc. 1990, 112, 7832). This hydrogel dissolves when $Ca^{2+}$ is replaced by a monovalent cation. Thus, in order to generate stable ionic hydrogels, it was important to synthesize a polymer with a cosubstituent that can be covalently cross-linked by $^{60}Co$ gamma irradiation or by ultraviolet light.

In the present invention we have designed a series of novel, dimensionally stable, pH sensitive poly (organophosphazene) hydrogels. The novel polymers contain an anionic substituent and an alkoxy or alkyl ether substituent as cosubstituent side groups attached to the phosphorus on the phosphorus-nitrogen backbone of the polyphosphazene. Highly preferred poly (organophosphazenes) useful for making the hydrogels of the instant invention are poly[(sodium oxybenzoate) (methoxyethoxyethoxy)phosphazene] polymers at various ratios of the two side groups. The ratio of the anionic side group to the alkoxy side group is not particularly limited and may range from about 99:1 to 1:99, preferably about 80:20 to 20:80, more preferably about 70:30 to 30:70, and most preferably the ratio is within the range of about 60:40 to 40:60.

Experimental Section

Reagents and Equipment. The synthesis reactions were carried out under an atmosphere of dry argon using standard Schlenk line techniques. Tetrahydrofuran, THF, (Omnisolv) was distilled from sodium benzophenone ketyl under a dry nitrogen atmosphere before use. Hexachlorocyclotriphosphazene (Ethyl Corp.) was obtained from a trimer-tetramer mixture by sublimation (30° C./0.2 mm Hg). Poly (dichlorophosphazene) was prepared by the ring-opening polymerization of the cyclic trimer in an evacuated Pyrex tube at 250° C. [Allcock, H. R.; Kugel, R. L. J. Am. Chem.

Soc. 1965, 87, 4216]. Propyl 4-hydroxybenzoate (Aldrich, 99+%) was recrystallized from a methylene chloride/hexane mixture prior to use. Methoxyethoxyethanol (Aldrich, 99+%) was distilled before use. Sodium hydride (60% dispersion), potassium tert-butoxide (Aldrich), sodium hydroxide (J. T. Baker), sodium chloride (Aldrich), calcium chloride (Fisher), ferric chloride hexahydrate (Aldrich), and the buffer solutions (Fluka) were used as received. All the $^{31}$P NMR (145 MHz) and $^1$H NMR (360 MHz) data were obtained with the use of a Bruker 360 MHz spectrometer. $^{31}$P NMR chemical shifts are reported in ppm relative to 85% $H_3PO_4$ at 0 ppm. Glass transition temperatures were obtained with use of a PerkinElmer DSC-7 with TAS-7 software. Molecular weights of the polymers were estimated by gel permeation chromatography using a Hewlett-Packard HP 1090 liquid chromatograph with polystyrene standards. Elemental analyses including sodium analysis were obtained by Galbraith Laboratories, Knoxville, Tenn.

Additionally, poly[bis(methoxyethoxyethoxy) phosphazene] was synthesized according to the procedure commonly used by those skilled in the art. The details of this procedure can be found in U.S. Pat. 5,414,025, for instance, which is hereby incorporated by reference.

EXAMPLE 1

Synthesis of Poly[propyloxybenzoate) (methoxyethoxyethoxy)phosphazenes]

These reactions were all carried out in a similar manner. The procedure for the synthesis of polymer 4a is given as a typical example. Poly(dichlorophosphazene), (3.0 g, 0.026 mol) was dissolved in dry THF (600 mL). Propyl 4-hydroxybenzoate (2.8 g, 0.016 mol) was added to a suspension of sodium hydride (0.9 g, 0.023 mol) in dry THF (400 mL). After the reaction was complete, the reagent solution was added very slowly to the polymer solution via a fritted addition funnel in order to remove excess sodium hydride. The reaction mixture was heated at reflux for 24 hours. Methoxyethoxyethanol (9.8 g, 0.082 mol) was added to a suspension of sodium hydride (2.2 g, 0.054 mol) in dry THF (500 mL). After the reaction was complete, this solution was added dropwise via a fritted addition funnel to the mixture containing the partially substituted polymer. The reaction mixture was heated at reflux for 48 hours. After the mixture was cooled, the volume of the solvent was reduced under vacuum. The polymer was isolated by precipitation into heptane. Polymers 4a and 5a were further purified by dialysis against 80:20 ethanol:water and against THF for 6 days. Polymers 6a and 7a were further purified by precipitation into water (3×) and then into heptane (3×). The polymers were dried under vacuum.

Polymers 4a and 5a were slightly hygroscopic and adhesive materials that showed fluid-like behavior after water absorption following prolonged exposure to the atmosphere. This behavior reflects the presence of the hydrophilic alkyl ether side group. Polymers 6a and 7a were less adhesive and more elastomeric. The polymers were insoluble in water, but their solubility in alcohol increased as the content of the methoxyethoxyethoxy side group was increased. The polymers had high molecular weights ($10^6$ Daltons) and glass transition temperatures that ranged from −38° C. to −17° C.

Table 1 shows characterization data for the poly [propyloxybenzoate)-(methoxyethoxyethoxy) phosphazenes] produced in Example 1. Polymer 4a is poly [(30% propyloxybenzoate)(70% methoxyethoxyethoxy) phosphazene]. Polymer 5a is poly[(50% propyloxybenzoate)(50% methoxyethoxyethoxy) phosphazene]. Polymer 6a is poly[(76% propyloxybenzoate)(24% methoxyethoxyethoxy) phosphazene]. Polymer 7a is poly[(94% propyloxybenzoate)(6% methoxyethoxyethoxy) phosphazene]. $^1$H NMR for polymers 4a–7a were the same except the integrations were different.

TABLE 1

Characterization Data for Polymers 4a–7a

| Polymer | $^{31}$P NMR | Mw | Tg | % C | % H | % N | % Cl |
|---|---|---|---|---|---|---|---|
| 4a | −7.7 | 1.0 × 10$^6$ | −38 | c. 48.90 | 6.90 | 4.39 | — |
| | −13.8 | | | f. 48.25 | 7.08 | 3.93 | 0.073 |
| | −19.8 | | | | | | |
| 5a | −7.6 | 1.1 × 10$^6$ | −33 | c. 52.39 | 6.43 | 4.09 | — |
| | −13.7 | | | f. 51.64 | 6.69 | 3.65 | 0.089 |
| | −20.2 | | | | | | |
| 6a | −7.5 | 1.5 × 10$^6$ | −27 | c. 56.51 | 5.87 | 3.74 | — |
| | −13.7 | | | f. 55.56 | 6.25 | 3.59 | 0.28 |
| | −20.0 | | | | | | |
| 7a | −13.8 | 3.8 × 10$^6$ | −17 | c. 58.88 | 5.55 | 3.53 | — |
| | −20.0 | | | f. 57.80 | 5.66 | 3.22 | 0.26 |

EXAMPLE 2

Preparation of Poly[(sodium oxybenzoate) (methoxyethoxyethoxy)phosphazenes]

These reactions were all carried out in a similar manner. The procedure for the preparation of polymer 4b is given as a typical example. Polymer 4a (7.5 g, 0.023 mol) was dissolved in THF (800 mL). The polymer solution was added to a mixture of potassium tertbutoxide (15.8 g, 0.14 mol) and water (1.3 g, 0.07 mol) in THF (200 mL). After 20 hours, the mixture was poured slowly into cold water (500 mL) with continuous stirring. Tetrahydrofuran was allowed to evaporate from the solution. The solution was then dialyzed against water (3 days). The dialysate was acidified with a few drops of concentrated hydrochloric acid to form the carboxylic acid and the resultant precipitate was washed with water, collected, and dried. The deprotected carboxylic acid polymers were insoluble in water and were soluble only in dimethyl sulfoxide, which made sample fabrication difficult. Thus, the acid polymer was then neutralized with 0.1M sodium hydroxide solution. The resultant solution was dialyzed against water for 5 days. The dialysate was filtered to remove insoluble impurities and the solvent was allowed to evaporate to obtain polymer 4b. The polymer was further dried under vacuum. The sodium salt derivative polymers 4b–7b were determined to be water soluble. Based on FT-IR, $^1$H NMR, and elemental analyses data, the hydrolysis of the ester groups was complete. Table 2 gives characterization data for polymers 4b–7b.

TABLE 2

Characterization Data for Polymers 4b–7b

| Polymer | $^{31}$P NMR | % C | % H | % N | % Cl |
|---|---|---|---|---|---|
| 4b | −5.9 | c. 43.78 | 5.80 | 4.56 | — |
| | −12.1 | f. 42.84 | 5.94 | 4.57 | 0.046 |
| | −18.1 | | | | |
| 5b | −6.4 | c. 44.56 | 4.67 | 4.34 | — |
| | −12.4 | f. 43.62 | 4.71 | 4.38 | 0.078 |
| | −18.5 | | | | |
| 6b | −6.4 | c. 45.48 | 3.36 | 4.08 | — |
| | −13.2 | f. 43.52 | 3.29 | 4.12 | 0.065 |
| | −19.3 | | | | |
| 7b | −13.1 | c. 46.11 | 2.45 | 3.90 | — |
| | −18.8 | f. 45.08 | 2.47 | 3.83 | 0.160 |

The sodium oxybenzoate content of the polymers was determined by sodium analysis. In order to discount the possibility that the sodium found in the polymers was due to sodium ions trapped within the methoxyethoxyethoxy units, the free acid derivatives of the polymers were also analyzed for this element. The percent sodium found was negligible. Furthermore, poly[bis(methoxyethoxyethoxy)phosphazene] was used as a control and was found to retain only traces of sodium (<0.09%). Table 3 shows the percent sodium oxybenzoate in polymers 4b–7b and the control.

TABLE 3

Percent Sodium Oxybenzoate in Polymers 4b–7b

| Polymer | % Sodium - Acid Form | % Sodium - Na Salt Form | % Sodium Oxybenzoate |
|---------|----------------------|-------------------------|----------------------|
| 4b      | c. —                 | 4.50                    | 30                   |
|         | f. 0.054             | 4.48                    | 30                   |
| 5b      | c. —                 | 7.06                    | 50                   |
|         | f. 0.096             | 6.96                    | 49                   |
| 6b      | c. —                 | 10.06                   | 75                   |
|         | f. 0.20              | 8.50                    | 64                   |
| 7b      | c. —                 | 12.12                   | 94                   |
|         | f. <0.018            | 8.46                    | 66                   |
| Control | c. —                 | 12.67                   | 100                  |
|         | f. 0.024             | 8.81                    | 70                   |

As shown in Table 3, polymers 4b and 5b were completely neutralized to their sodium salts, while polymers 6b, 7b and the control (poly[bis(methoxyethoxyethoxy)phosphazene] were only partially neutralized as indicated by the discrepancy between the calculated and experimental sodium content. The incomplete neutralization of the carboxylic acid groups in 6b and 7b, and in the control indicates that the polymers cannot accommodate negative charges above a certain level, presumably due to increased electrostatic repulsion at higher charge densities. This macromolecular system can accommodate an average of about 60 to 70 percent of the side groups as sodium oxybenzoate units. The ability of the polymer to accommodate such a high content of the ionic side groups may be due, in part, to a relatively strong binding of the sodium ions to the carboxylate units in polyphosphazenes, thus decreasing the effective charge density on the polymer. Furthermore, the flexibility of the polyphosphazene backbone may allow the polymer to adopt a conformation that minimizes electrostatic repulsion.

The swelling behavior of these polymers involves several parameters including the degree of cross-linking and the ionic character of the gel. A high degree of cross-linking decreases swelling. In contrast, a high ion concentration in the gel increases swelling because of increased water flow into the gel by osmosis. Furthermore, repulsion of charges within the gel causes the gel to expand more, and this increases swelling. The swellability of the gels also depends on the properties of the swelling medium, such as pH, ionic strength, and the charge of the cation present in the medium.

EXAMPLE 3

Effect of pH on the Swellability

Samples of polymers 4b–7b (5 mm×5 mm) were cross-linked by exposure to $^{60}$Co gamma irradiation at 20 MRads at the Breazele Nuclear Reactor at the Pennsylvania State University. Control samples of polymers 4a–7a and poly[bis(methoxyethoxyethoxy)-phosphazene] were also cross-linked at the same dosage.

The crosslinked polymers were allowed to swell in buffer solutions with pH of 4, 6, 7.4, and 10. After 24 hours the buffer solution was removed and the gel was weighed (wet weight). Based on FIG. 6, 24 hours is sufficient time to achieved maximum swelling of the gels. The gel was then air-dried for 10 hours and was dried under vacuum for 24 hours. The weight of the dry gel was then measured. The gel was further dried to constant weight (dry weight). Results are reported as degree of swelling, $D_{SW}$ which was expressed as the ratio of wet and dry weight (see Kudela, V. In *Ency. Polym. Sci. and Technol.*; Kroschwitz, J. I., Ed.; Wiley: new Yourk, 1987; Vol. 7, pg. 783). For the results shown in FIG. 6 the dry weight was determined before carrying out the swelling studies at 37° C.

The resultant gels showed lower degrees of swelling at acidic pH than at basic pH (see FIG. 1). The high ion concentration inside the gel increases swelling due to osmosis and charge repulsion. Thus, when the degree of ionization is decreased, swelling is reduced. At low pH the degree of ionization is reduced due to protonization of the oxybenzoate units. The swellability of each gel at pH 7.4 and 10 were similar since the carboxylate groups had already reached their maximum ionization. This pH-sensitive behavior is typical of ionic hydrogels. At all four pH values the cross-linked polymer with the higher oxybenzoate/methoxyethoxyethoxy side group ratio (e.g., 7b) absorbed more aqueous medium than did the polymers with a lower side group ratio (e.g., 4b). Two factors contribute to this phenomenon: 1) the lower degree of cross-linking of polymer 7b due to its lower loading of the methoxyethoxyethoxy unit, and 2) the higher sodium oxybenzoate concentration of polymer 7b relative to that of the other anionic polymers. The swelling behavior at different pH values of cross-linked polymers 4a–7a and the control was determined for comparison. As illustrated in FIG. 1 these polymers were not sensitive to changes in the pH of the aqueous medium.

EXAMPLE 4

Effect of Ionic Strength on the Swellability

Figure 2:
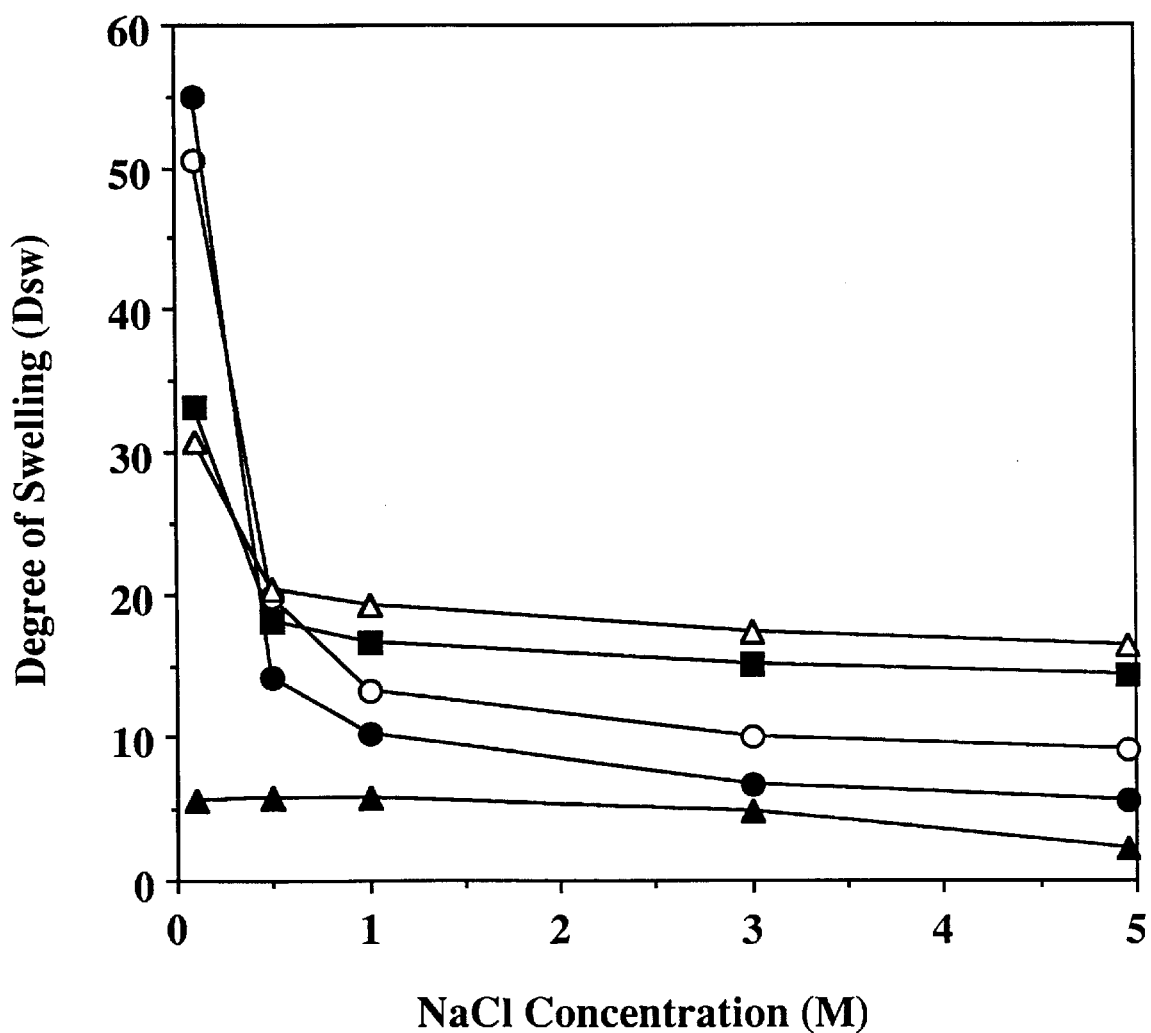
FIG. 2 is a graph showing the effect of ionic strength on the equilibrium degree of swelling of the hydrogels: 4b (triangle), 5b (dark square), 6b (circle), 7b (dark circle), and control (dark triangle).

The cross-linked polymers, 4b–7b, were allowed to swell in various concentration of sodium chloride solutions: 0.1, 0.5, 1.0, 3.0, and 5.0M for 24 hours. The gel was weighed (wet weight), soaked in distilled, deionized water for 24 hours to remove the salt, and then dried to constant weight (dry weight). In general, the swelling of the hydrogels decreased as the ionic strength of the swelling solution was increased. This is attributed to counterion concentration, shielding of charges on the oxybenzoate side group, and a high ion concentration outside the gel. As the ionic strength of the swelling solution is increased, the osmotic pressure inside the gel is decreased and the equilibrium degree of swelling of the gels is reduced as predicted by the Donnan equilibrium (see Ricka, J.; Tanaka, T. *Macromolecules* 1984, 17, 2916). The reduction in swelling of hydrogels 4b–7b as the ionic strength was increased is evident from FIG. 2. It was also found that, at low ionic strengths, the hydrogels with the higher percentage of sodium oxybenzoate units and lower cross-link density swelled more than the hydrogels with lower sodium oxybenzoate content and higher degree of cross-linking.

EXAMPLE 5

Effect of Cation Charge on Swellability

Figure 3:
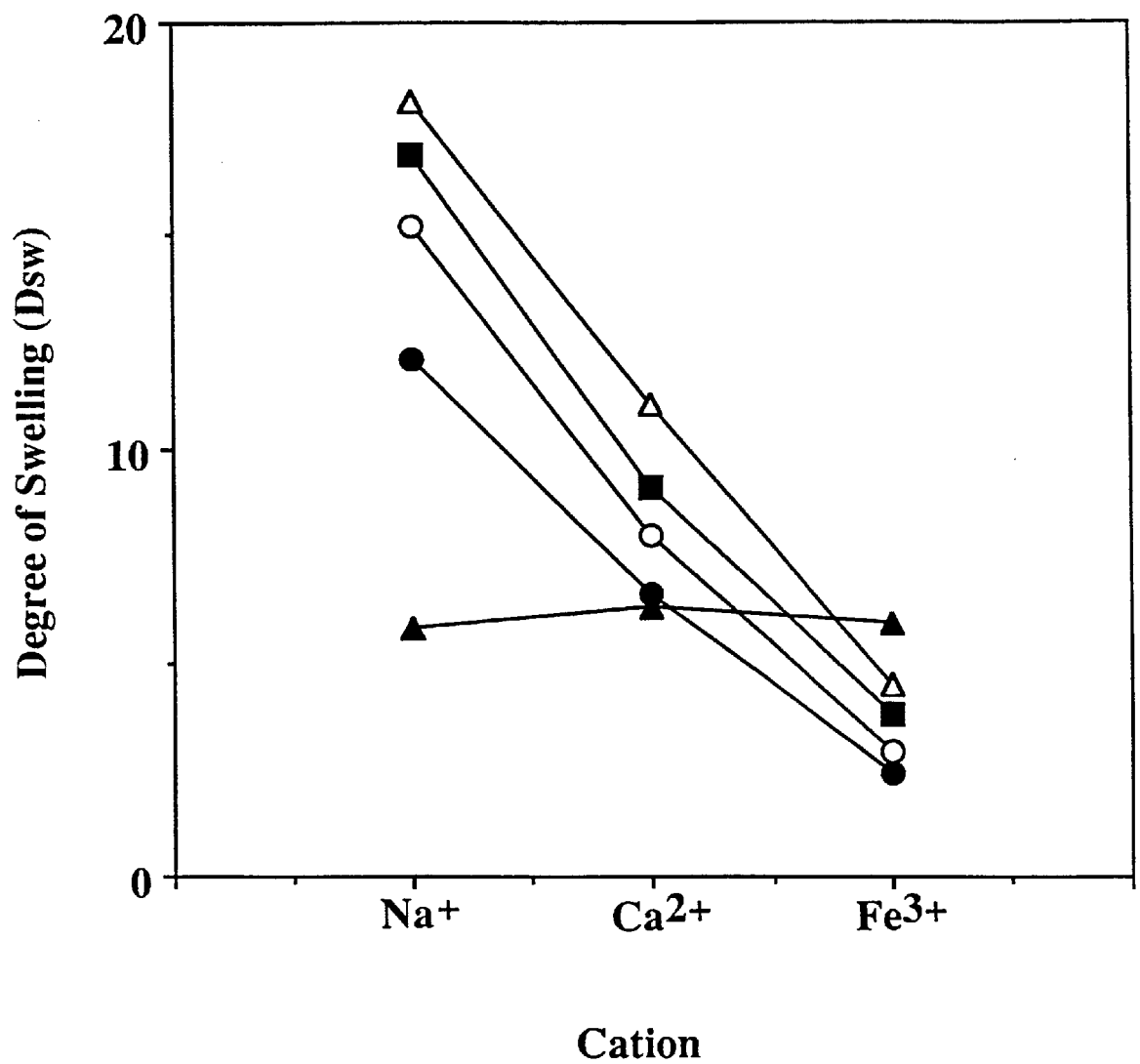
FIG. 3 is a graph showing the effect of cation charge on the equilibrium degree of swelling of the hydrogels: 4b (triangle), 5b (dark square), 6b (circle), 7b (dark circle), and control (dark triangle). The ionic strength of each salt solution was kept constant (I=1).

Aqueous solutions of sodium chloride (1 m), calcium chloride (0.33 m), and ferric chloride (0.17 m) with the same ionic strength (I=1) were prepared. Calculations of the molar concentration were based on the Debye-Hüickel theory of ionic solutions. The polymers were allowed to swell in these solutions for 24 hours. The degree of swelling of the gels was reduced as the charge of the cation was increased (see FIG. 3). A multivalent cation will further cross-link the gel via ioinic bridges between the carboxylate groups and thus reduce swelling (each ion will be associated with a larger number of carboxylate groups). The degree of swelling of poly[bis(methoxyethoxyethoxy)phosphazene] was not affected by the type of cation present in the swelling medium. The wet and dry weights were determined as described above.

EXAMPLE 6

Effect of Radiation Dose on Swellability

Since it is difficult to accurately determine the cross-link density of ionic polyphosphazene hydrogels, we investigated the degree of swelling as a function of radiation dose. Samples of polymers 4b and 6b were cross-linked by exposure to $^{60}$Co gamma irradiation at radiation doses of 5, 7.5, 10, 12.5, 15, and 20 MRads. The cross-linked polymers were allowed to swell in distilled, deionized water. After 24 hours, the wet and dry weights were determined as before. The wet weight for 6b which was exposed to 5 MRads of radiation could not be accurately measured since the gel disintegrated after absorption of water.

Figure 4:
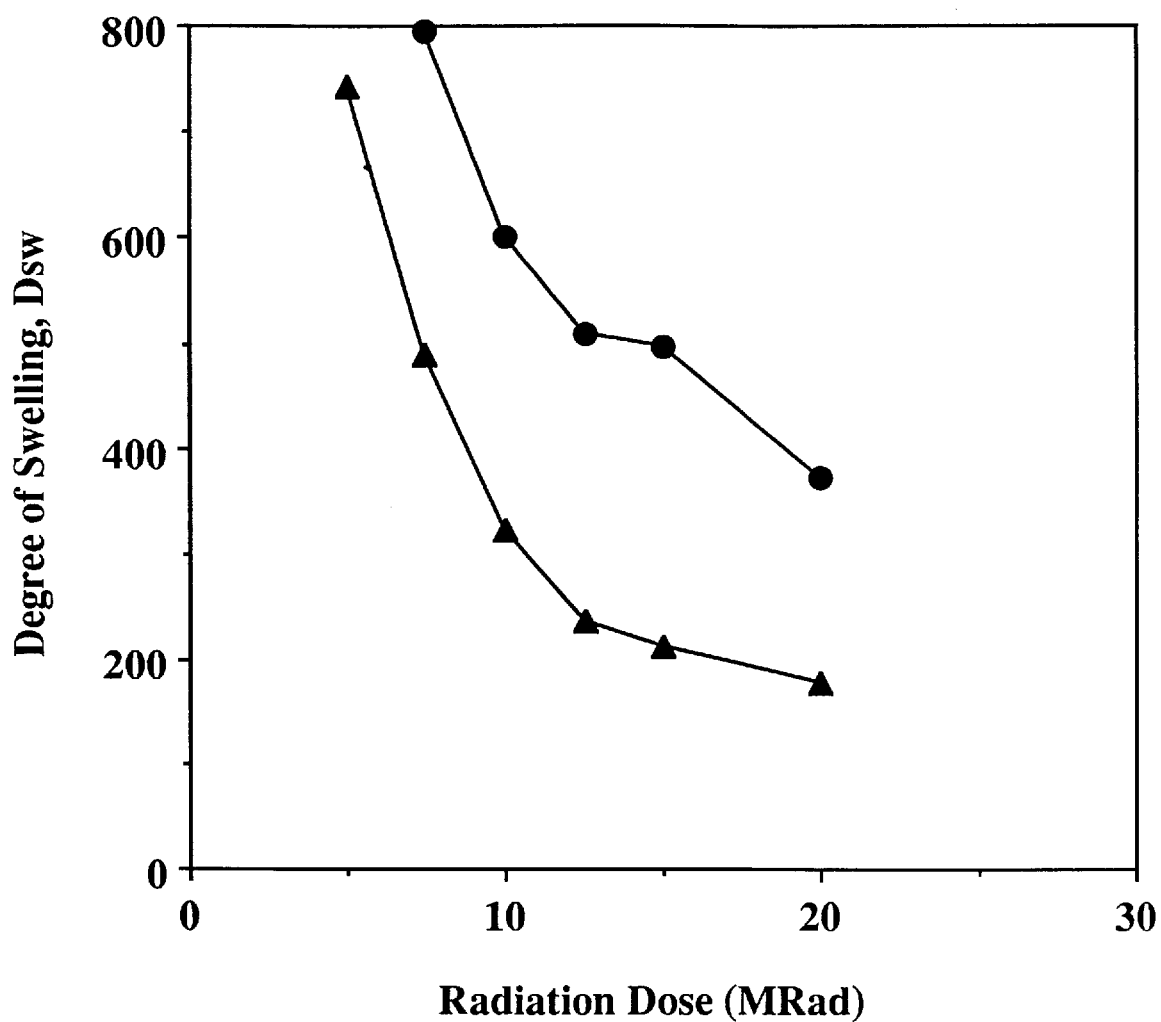
FIG. 4 is a graph showing the effect of radiation dose on the equilibrium degree of swelling of the hydrogels 4b (dark triangle) and 6b (dark circle) in distilled, deionized water.

As shown in FIG. 4, the degree of swelling of polymers 4b and 6b decreased with increasing radiation dose, as a consequence of increased cross-linking. Increases in the radiation dose also resulted in an increase in the dimensional stability of the water-swollen gels.

EXAMPLE 7

Small-Molecule Diffusion Release Rates

This example investigated the small-molecule diffusion rates of the polymers of the instant invention. One reason for the current interest in ionic hydrogels for both biological and non-biological uses is the possibility that the ease of diffusion of small molecules through the gel can be controlled by pH or ionic strength. The release of the dye, Biebrich Scarlet, from the cross-linked polymers 4b and 6b was studied as a model to probe the changes in diffusion.

The polymer (4b or 6b) and Biebrich Scarlet were combined to prepare a mixture containing 2% of the dye. This mixture was dissolved in water to make a viscous solution which was poured onto TEFLON-lined dishes. The solution was allowed to dry slowly for 2 to 3 days. The resulting film was further dried at 35° C. under vacuum for 24 hours. The dried film was cut into 5 mm×5 mm pieces. The polymer-dye matrices were then placed in 20 mL buffer solutions (pH 2 and pH 7.4). The studies were carried out at 37° C. The solutions were replaced periodically with fresh buffer solutions to create infinite sink conditions. Release of Biebrich Scarlet was determined spectrophotometrically at a wavelength of 505 nm. These studies were carried out in triplicates. Results are reported in fractional release over time, Mt/M∞. The average standard deviation was less than 2%.

Figure 5:
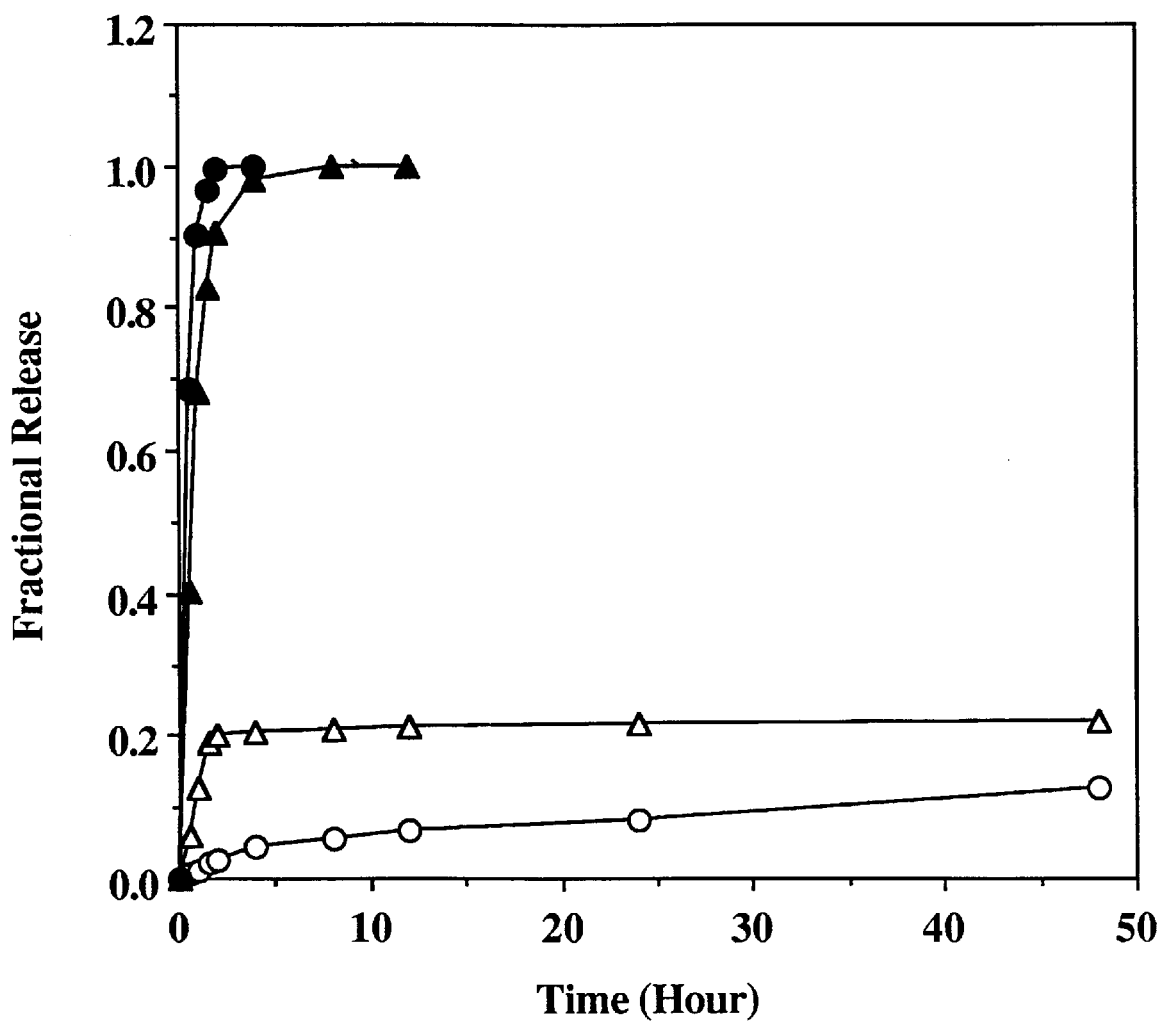
FIG. 5 is a graph of the release rate of Biebrich Scarlet at 37° C. in pH 2 buffer from the hydrogels 4b (triangle) and 6b (circle), and in pH 7.4 buffer from the hydrogels 4b (dark triangle) and 6b (dark circle).
Figure 6:
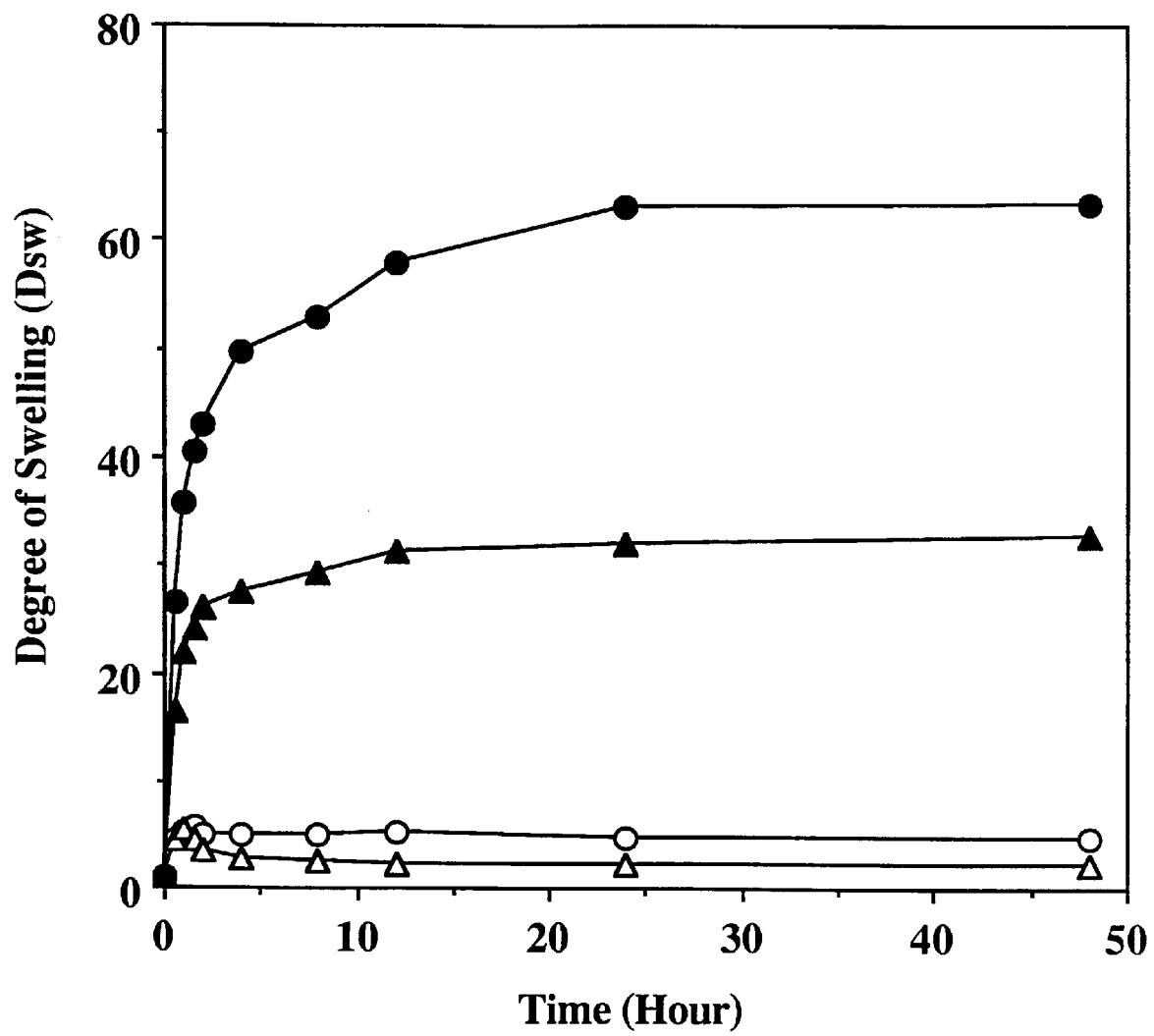
FIG. 6 is a graph of the rate of swelling at 37° C. in pH 2 buffer for the hydrogels 4b (triangle) and 6b (circle), and in a pH 7.4 buffer for the hydrogels 4b (dark triangle) and 6b (dark circle).

A radiation dose of 20 MRads was used because it yielded gels with a high dimensional stability. The results are reported as the fractional release of the dye over time, Mt/M∞, where Mt is the amount of dye released up to time t and M∞ is the amount of dye present initially in the polymer. In pH 2 buffer solution, only a small fraction of the dye was released from the hydrogels even after 48 hours (see FIG. 5). The rate of release of the dye from hydrogel 4b was significantly higher than from hydrogel 6b although 4b had a slightly lower degree of swelling than 6b. This is attributed to the larger number of carboxylate groups present in 6b than in 4b which will be mostly protonated in pH 2 buffer. This could then lead to greater interaction of the hydrogel with the dye through hydrogen bonding with the azo, hydroxy, and sulfonate groups of the dye. At pH 7.4, the release of the dye from hydrogels 4b and 6b was much faster. All the dye was released from 4b and 6b during 12 and 4 hours respectively. This rapid release was attributed to the high swellability of the gels at pH 7.4. The linear release profile of the dye during the first 2 to 4 hours can be explained by the rapid swelling of the gels during this period as shown in FIG. 6. Thereafter, the release rate slowed as the gels approached their equilibrium degree of swelling. These release profiles are comparable to those of drugs released from natural and synthetic hydrogels and can easily be modified by changing the side group ratios of the polymer.

The hydrolytic stability of the hydrogels at low pH was a concern in this study since poly[bis(carboxylatophenoxy) phosphazene] is known to be hydrolyzable in strongly acidic solutions. Thus, the stability of hydrogels 4b and 6b was investigated. Samples of the gels were removed from the pH 2 buffer solution at pre-determined times and were monitored by $^{31}$P NMR spectroscopy. A small broad peak at −3.0 ppm appeared in the NMR spectra of the gels after 24 hours exposure to the buffer solution, and this indicated the onset of hydrolysis. However, the slow decomposition of the hydrogels at pH 2 had no detectable effect on the dye release profiles. The hydrolysis of the polymer is so slow that erosion-controlled release is overshadowed by the faster swelling-controlled diffusion release mechanism. No hydrolysis of the hydrogels was detected after 72 hours in pH 7.4 buffer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A poly(organophosphazene) polymer having repeating monomeric units of the formula [—N=P(R$_1$)$_x$(R$_2$)$_y$—]$_n$ wherein R$_1$ is selected from the group consisting of aryloxy, alkylaryloxy, alkylamino and arylamino and contains at least one carboxylic acid or acid ester unit; R$_2$ comprises an alkoxy or alkoxy ether group of the formula —O—[(R$_3$)—O]$_z$—(R$_4$), wherein z is an integer of 0 to 40 and R$_3$ and R$_4$ are aliphatic groups; and x+y=2 with x>0, y>0 and n is between 3 and about 100,000.

2. A polymer according to claim 1 wherein the ratio of x to y is within the range of about 0.8:0.2 to about 0.2:0.8 and n is between about 5,000 and about 20,000.

3. A polymer according to claim 1 that has been ester hydrolyzed and cross-linked to form a hydrogel.

4. A polymer according to claim 3 wherein the ratio of x to y is within the range of about 0.8:0.2 to about 0.2:0.8 and n is between about 5,000 and about 20,000.

5. A poly(organophosphazene) polymer having repeating monomeric units of the formula [—N=P(R$_1$)$_x$(R$_2$)$_y$—]$_n$ wherein R$_1$ comprises carboxylatophenoxy; R$_2$ comprises methoxyethoxyethoxy; and x+y=2 with x>0, y>0 and n is between 3 and about 100,000.

6. A polymer according to claim 5 wherein the ratio of x to y is within the range of about 0.8:0.2 to about 0.2:0.8 and n is between about 5,000 and about 20,000.

7. A polymer according to claim 5 that has been ester hydrolyzed and cross-linked to form a hydrogel.

8. A polymer according to claim 7 wherein the ratio of x to y is within the range of about 0.8:0.2 to about 0.2:0.8 and n is between about 5,000 and about 20,000.

* * * * *